United States Patent
Ramamurthy et al.

(10) Patent No.: US 9,041,516 B2
(45) Date of Patent: May 26, 2015

(54) CONTEXT AWARE DETECTION AND MOBILE PLATFORM WAKE

(71) Applicant: Intel Corporation, Santa Clara, CA (US)

(72) Inventors: Venkatesh Ramamurthy, Hillsboro, OR (US); Gyan Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 13/652,621

(22) Filed: Oct. 16, 2012

(65) Prior Publication Data
US 2014/0104043 A1    Apr. 17, 2014

(51) Int. Cl.
H04Q 5/22     (2006.01)
G06K 7/01     (2006.01)

(52) U.S. Cl.
CPC .................................. *G06K 7/01* (2013.01)

(58) Field of Classification Search
CPC ...................... G06K 7/008; G06K 19/0723
USPC ............... 340/10.3, 10.5, 12.51, 13.26, 572.1
See application file for complete search history.

(56) References Cited

U.S. PATENT DOCUMENTS

| | | | |
|---|---|---|---|
| 7,124,943 B2 * | 10/2006 | Quan et al. ..................... | 235/451 |
| 7,215,976 B2 * | 5/2007 | Brideglall ................... | 455/552.1 |
| 7,604,178 B2 * | 10/2009 | Stewart ........................ | 235/492 |
| 2010/0229082 A1 * | 9/2010 | Karmarkar et al. ........... | 715/205 |

* cited by examiner

*Primary Examiner* — Vernal Brown
(74) *Attorney, Agent, or Firm* — Schwegmen Lundberg & Woessner, P.A.

(57) ABSTRACT

A device includes a processor having a standby state, a control unit coupled to the processor to receive wireless identification information, and a storage device to store a processor wake policy. The control unit applies the policy to received wireless identification information to wake the processor.

21 Claims, 3 Drawing Sheets

CONTEXT AWARE DETECTION AND MOBILE PLATFORM WAKE

BACKGROUND

Mobile devices can be used effectively to communicate data on behalf of a user. Most context based uses are primarily based on locations, but there are many cases where location information may not be available due to absence of global positioning services (GPS) or absence of dead reckoning support. In such situations, mobile devices cannot be used effectively to find the right context for the device to wake for processing of data and request data. A mobile device may not primarily be connected to WiFi, rendering context detection data processing over WiFi infeasible.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, tablet device, smart phone, server or other computer system.

Figure 1:
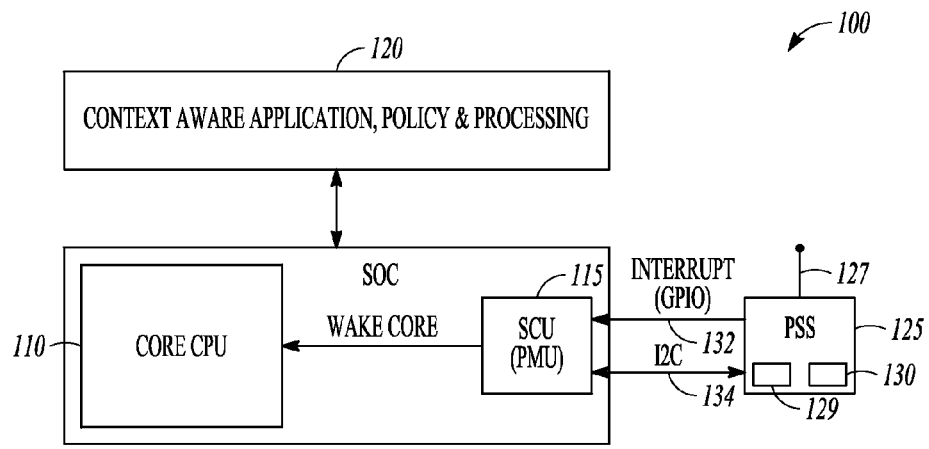
FIG. 1 is a block diagram of a mobile device that wakes a processor responsive to received communications according to an example embodiment.

A mobile device is illustrated in block form at 100 in FIG. 1. The device 100 includes a processor 110 having a standby state. The standby state is a low power state where the processor 110 performs few, if any, calculations. The low power state is sometimes referred to as a sleep mode or standby state. It is a state from which the processor may be awakened, such as by an interrupt from another component in the device 100 or via a user interaction with device 100.

Device 100 also includes a control unit 115 coupled to the processor 110. The control unit 115 is always active and responsible for management of a battery, power, and security of the mobile device 100 in one embodiment. The control unit 115 receives wireless identification information. A storage device 120 may be used to store a processor wake policy. The control unit 115 applies the policy to received wireless identification information to wake the processor.

In one embodiment, the wireless identification information comprises RFID packets. The control unit validates encrypted and signed RFID packets in a further embodiment. The control unit selectively discontinues receipt of wireless identification information when a selected number of unauthorized packets are received within a selected time period.

In a further embodiment, device 100 includes a processor secure storage (PSS) RFID module 125 having an antenna 127, circuitry 129, and a memory bank 130. The RFID module 125 is coupled to the control unit 115 via a secure interlink 132 to provide received wireless identification information directly to the control unit 115. The RFID module memory bank 130 is not directly accessible to the processor 110 and is invisible to an operating system running on processor 110 in one embodiment. A further secure interlink 134 may be used to provide two way communication between the control unit 115 and RFID module 125. In some embodiments, the RFID module 125 is a discrete component having a hardware chip with antenna and secured connection to the control unit 115. RFID module 125 may also have its own processor, but does not have power. Power is drawing from an RFID signal. The RFID module 125 may also respond back responsive to received signals.

In some embodiments, the wireless identification information is provided in the form of RFID packets that include a unique RF TAG ID. The device rejects packets not having the unique RF TAG ID. In some embodiments, the RFID module 125 is only coupled to the control unit 115. The interlinks 132 and 134 are secure connections coupled between the RFID module 125 and the control unit 115.

RFID module 125 in one embodiment is integrated with the mobile device and connected over a secure connection such that the system control unit can manage memory in the RFID module without knowledge of the operating system. The RFID module has an RF TAG ID that is unique to the mobile device and only data received over the RFID module is passed on when the TAG ID matches. All other data will be rejected and the system control unit will not process any data that is not targeted for a specific device. The RFID range is usually about 15-20 meters. In one embodiment, only authorized and verified data will be received by the RFID module.

An RFID reader/writer may be positioned near an entrance to a store, shopping mall, library, class room, or other location to send data via RF to the device 100. The information will include identification and validation information, as well as other information that the type of location desires to send to a user. Such information may include advertisements, coupons, special deals, event notices and other information. When the RFID module 125 receives communications and forwards them to the control unit 115, the control unit 115 will apply the wake policy, and wake the processor responsive to the communications meeting the wake policy. The processor may then provide for user interactions, such as providing displays and accepting input from the user via touchscreens, voice, buttons, or otherwise.

The RFID module 125 in one embodiment is a passively powered device. No active energy from the device 110 is used to power the RFID module 125. The RFID module 125 utilizes the emitted electro magnetic spectrum from the RFID reader/writer transmitter to drive the signal to the processor 110 through the interlinks 132, 134.

Figure 2:
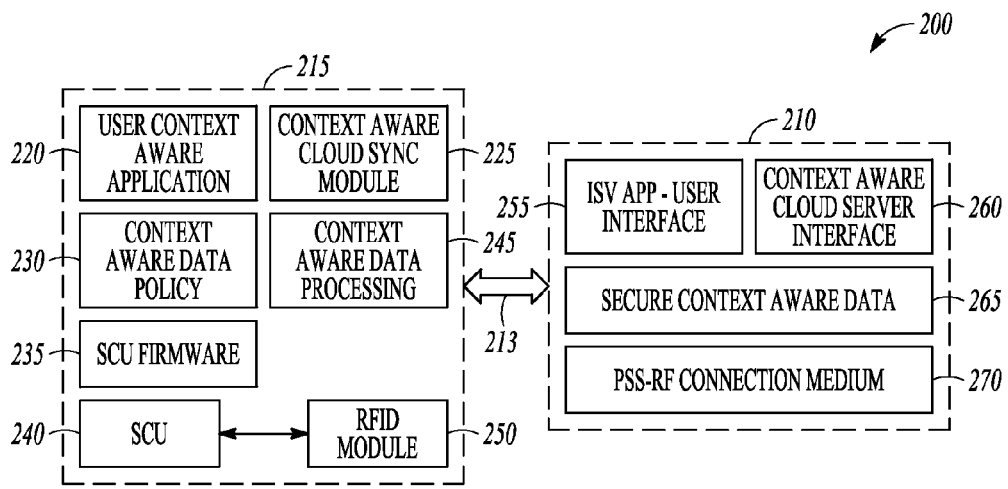
FIG. 2 is block diagram illustrating a software architecture for performing methods according to an example embodiment.

FIG. 2 is a block diagram illustrating a software architecture 200. The architecture 200 includes software blocks for a mobile device at broken line 215, and software blocks for a networked service at broken line 210. A network connection 213, such as the Internet may be used for communications between the mobile device 215 and service 210, which may also be referred to as a cloud type of service, where multiple devices may be providing services transparent to the mobile device, which just views the service as a single entity referred to as a cloud.

The mobile device 215 includes a context module that includes a user context aware application 220 and a context aware cloud synchronization module 225, both of which may be implemented by program code stored on a computer readable storage device, and run in an operating system space as a user application. They may be executed by the mobile device processor when the processor is awake. The context aware application 220 provides an interface to a user of the device to define the policy, allowing the user to configure and allow or disallow device or processor wake or interactions. The user can also define the kind, type, or specific application communications which may result in waking the processor. The user may also specify for each communication whether the processor may be awakened with or without user interaction. In some embodiments, the user may specify that an alarm be raised to the user when communications are received.

The policy may specify location of the device that may result in waking the processor. The policy may further be defined to specify specific applications and types of applications, as well as types of businesses and locations from which information should be received and processed by waking the processor. For example, a user may specify that when information is being offered from a library, the information should be verified and processed. The user may further limit libraries to libraries in a certain location or area, such as city, county, state, etc. The policy may further indicate that all grocery stores offering information should be accepted, or only those from a certain store or chain of stores.

In one embodiment, the cloud synchronization module 225 is used to store the policy on remote storage offered by service 210. The cloud synchronization module 225 may encrypt the policy prior to storing the policy on remote storage. Module 225 allows the user to manage the policy in the cloud such that only authorized vendors or types of vendors will be allowed to send messages for the devices. The cloud will be responsible for ensuring that the mobile device root of trust such that data which is encrypted/signed using a device specific key will be accessed by the system control unit. The cloud may encrypt and sign data on behalf of vendors and provide an encrypted blob back.

The context aware data policy may also be stored in mobile device 215 firmware as indicated at policy block 230. Policy block 230 is accessible by control unit firmware indicated at 235 and system control unit 240. A context aware data processing firmware block 245 may be used to perform comparison of received information with the policy in some embodiments. The policy may be sent to the system control unit, which is always running and responsible for receiving data over RFID and detecting the context securely. The system control unit receives the data over RFID and is also capable of enabling and disabling the RFID if continuously unauthorized packets are received. The data received over RF may be encrypted and signed in some embodiments so that only the system control unit can validate the data integrity. If the data is authorized and user context policy are matched, then based on the policy, the device is awakened and further action is taken.

In further embodiments, the blocks are representative of just one division of functions between hardware and firmware, and other divisions may be used to accomplish the same functions described herein.

RFID module 250 is illustrated as being coupled to the system control unit 240, and also as receiving and sending information via the network connection 213. In some embodiments, RFID module 250 operates as a standard RFID chip in terms of receiving broadcast information and utilizing the power from the broadcast to power itself and store the data. It may also transmit information responsive to the broadcast information. The responsiveness may be controlled as a function of the policy.

Service 210 in one embodiment contains a user interface block 255 and a context aware cloud server interface 260 to interface with the mobile device to store the policy received from the device 215 and to provide locations such as stores, schools, libraries, etc., to generate secure context aware data indicated at 265. This data may contain the RF TAG ID for multiple devices 215, as well as other information for transmission by an RFID transmitter via a connection medium 270.

Figure 3:
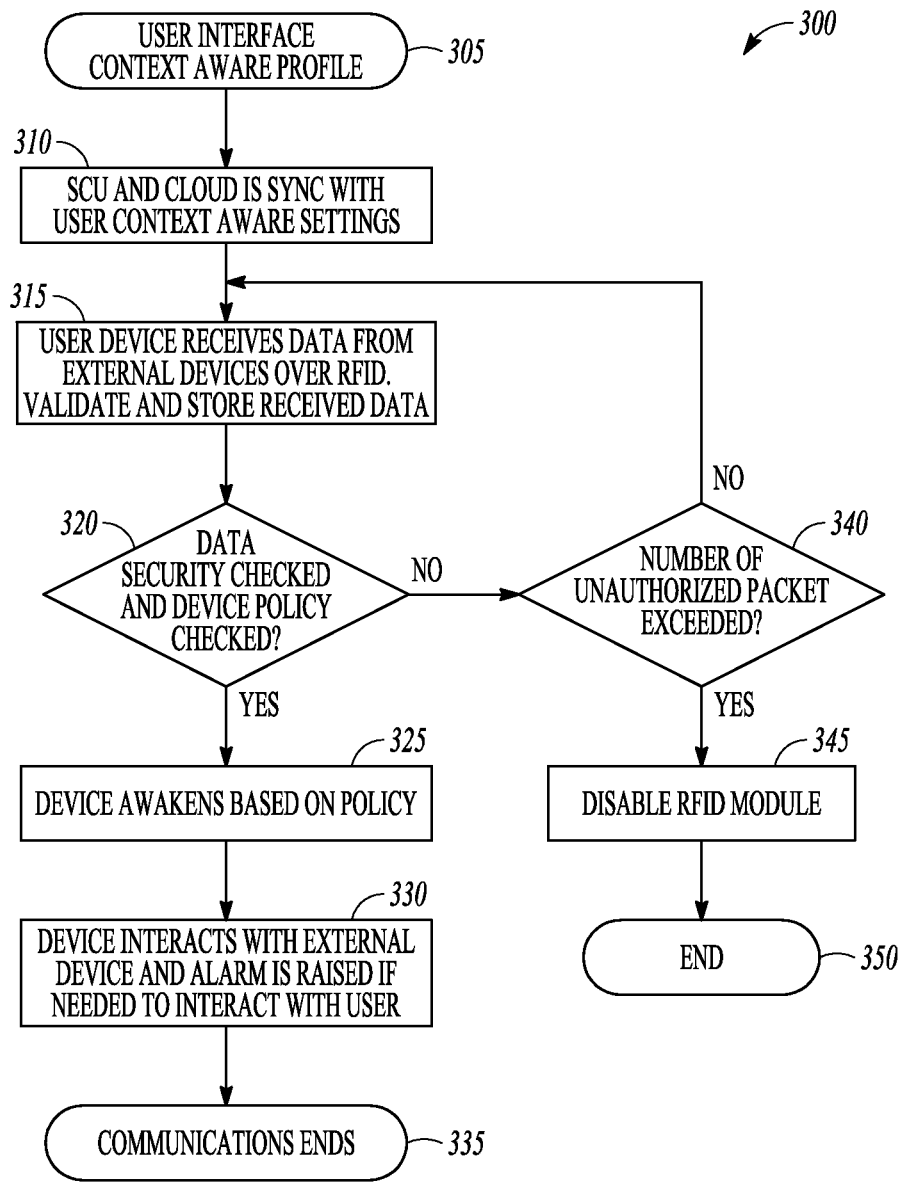
FIG. 3 is a flow chart illustrating a method of waking a processor according to an example embodiment.

FIG. 3 is a flowchart of an example method 300 for operation on a device that receives RFID transmissions. The method 300 includes utilizing an application on a mobile device to configure a context aware policy, referred to as a profile at 305. A system control unit in the mobile device and a service, such as a cloud, are then synchronized with the context aware profile of the mobile device at 310. Once the profile is configured or otherwise obtained, the user device may receive data at 315 from external devices over a wireless connection such as RFID. The received data may also be stored at 315 on a computer readable storage device. At 320, the received data is validated. The data security may be checked, along with the device policy or profile. If the received data is validated and successfully compared to the policy specifying a context of the mobile device at 320, a processor is awakened at 325 when the validated received data complies with the policy. Waking the processor at 325 may be accomplished by sending an interrupt in one embodiment, with the standby state of the processor configured to accept interrupts and wake upon receiving them.

In one embodiment, the device, or the system control unit in further embodiments interacts with an external device and an alarm is raised if specified by the policy if user interaction is specified in the policy. The interaction may result in the transfer of further data with the external device via one or more different network connections. The communication may then end at 335, with control returning to 315 if more data is received.

If at 320, the information, usually in the form of packets is not validated, a decision block 340 is used to determine if the number of unauthorized received packets exceeds a threshold. The threshold may be based on a number of unauthorized packets being received within a selected time frame, or a running total of unauthorized packets, or a number of different parameters as desired. If the threshold has not been exceeded, then the processes control returns to block 315 to receive more data. If the threshold was exceeded, the RFID module may be disabled, such that future transmissions are ignored until reset by the user as indicated at 345. The process will then end at 350 until the RFID module is reset. In one embodiment, a control unit performs the comparing at 320 independent of the processor and while the processor is not in an awake state. In further embodiments, a computer readable storage device includes a memory bank that is not directly accessible to the processor of the mobile device.

In one embodiment, the PSS-RFID module is integrated with a mobile device and is connected over a secure I2C connection such that only the system control unit can manage the PSS_RFID and is invisible to host OS. The RFID has a RF TAG ID which is unique to the platform and only data received over the RFID when the RF TAG ID matches, all other data will be rejected and SCU will not processing any data which is not targeted for a specific device. The RFID range is usually 15-20 meters and only the authorized data will be received by the PSS_RFID module.

Figure 4:
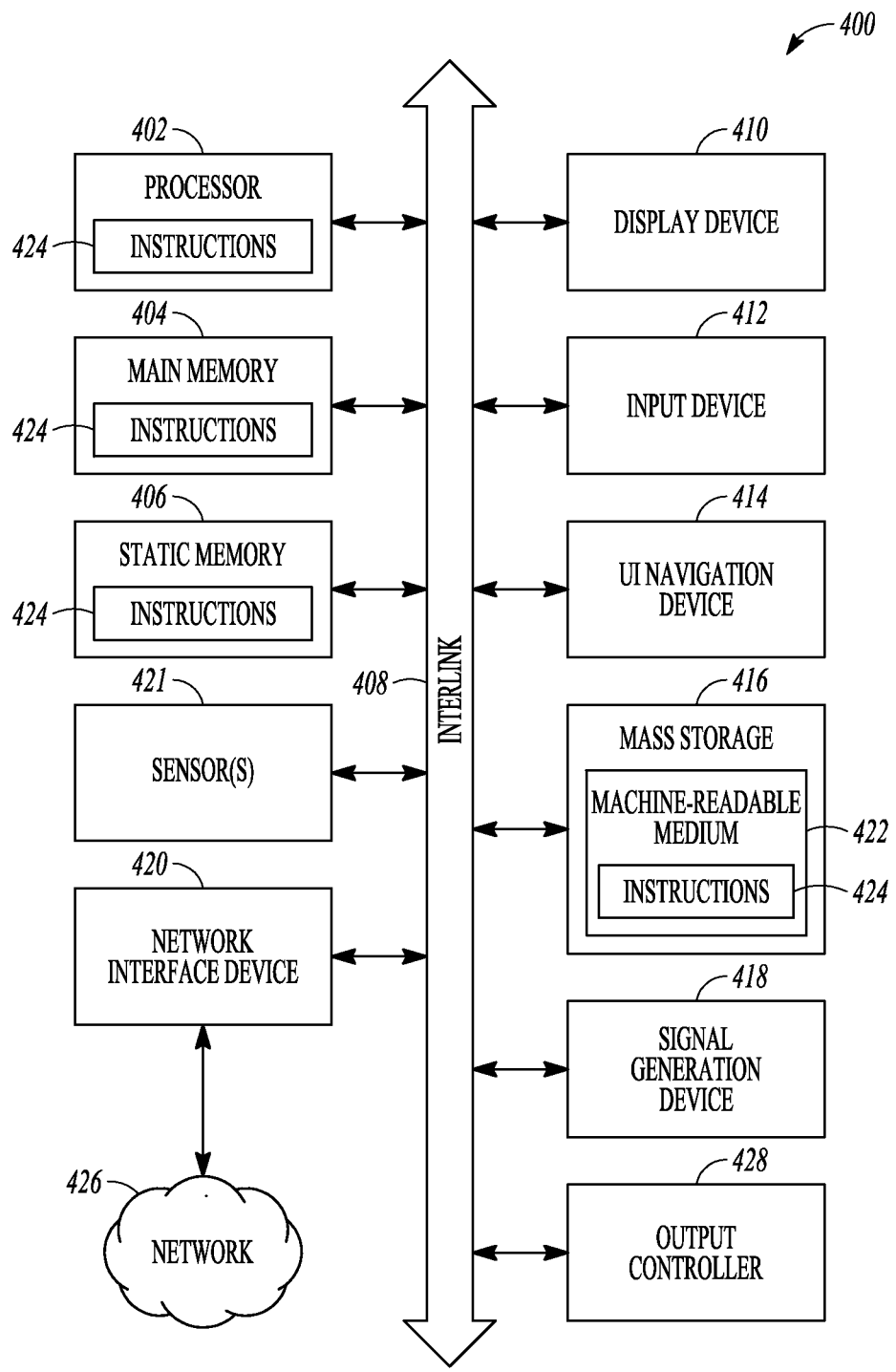
FIG. 4 is a block diagram of an example machine for implementing one or more methods according to an example embodiment.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 400 may include a hardware processor 402 (e.g., a central processing unit (CPU), a graphics processing unit (GPU), a hardware processor core, a control unit, RFID Module, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR)) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) that configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi- Fi®, IEEE 802.16 family of standards known as WiMax®), peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

In the following examples, specifics in the examples may be used anywhere in one or more embodiments:

Example 1 may include a processor or other computing device having a standby state, a storage device to store a processor wake policy, a control unit coupled to the processor and arranged to: receive wireless identification information and apply the processor wake policy to received wireless identification information to wake the processor.

In example 2, the subject matter of example 1 wherein the wireless identification information optionally includes RFID packets.

In example 3, the subject matter of example 1 or 2 may include the control unit validating encrypted and signed RFID packets.

In example 4, the subject matter of examples 1-3 wherein the control unit optionally selectively discontinues receipt of wireless identification information.

In example 5, the subject matter of examples 1-4 and further comprising an RFID module having an antenna, circuitry, and a memory bank, the RFID module being coupled to the control unit to provide wireless identification information directly to the control unit, wherein the RFID module memory bank is not directly accessible to the processor.

In example 6, the subject matter of examples 1-5 wherein the wireless identification information optionally comprises RFID packets that include a unique RF TAG ID, and wherein packets not having the unique RF TAG ID are rejected.

In example 7, the subject matter of examples 1-6 wherein the RFID module is optionally only coupled to the control unit, and wherein a secure connection is optionally coupled between the RFID module and the control unit.

In example 8, the subject matter of examples 1-7 and optionally further including a context module to provide an interface to a user of the device to define the processor wake policy based on location of the device.

In example 9, the subject matter of example 8 wherein the interface is provided to the user of the device to optionally define the processor wake policy based on specific applications and types of applications.

In example 10, the subject matter of examples 1-9 and optionally including a cloud module to store the processor wake policy on remote storage.

In example 11, the subject matter of example 10 wherein the cloud module optionally encrypts the processor wake policy prior to storing the policy on remote storage.

In example 12, a mobile device includes a processor having a standby state, a storage device to store a processor wake policy, a touchscreen coupled to the processor, an RFID module to receive RFID packets, a control unit coupled to the processor and to the RFID module, the control unit arranged to apply the processor wake policy to received RFID packets to wake the processor.

In example 13, the subject matter of example 12 wherein the control unit optionally validates encrypted and signed RFID packets.

In example 14, the subject matter of example 13 wherein the control unit optionally selectively discontinues receipt of wireless identification information upon receipt of a selected number of unauthorized RFID packets.

In example 15, the subject matter of examples 12-14 wherein optionally only RFID packets that include a unique RF TAG ID are validated.

In example 16, the subject matter of examples 12-15 and further optionally including a context module to execute on the processor to provide an interface to a user of the device to define the processor wake policy based on location of the device.

In example 17, the subject matter of example 16 wherein the interface is optionally provided to the user of the device to define the processor wake policy based on specific applications and types of applications.

In example 18, the subject matter of examples 12-17 and further optionally including a cloud module to execute on the processor to store the processor wake policy on remote storage.

In example 19, the subject matter of example 18 wherein the cloud module encrypts the policy prior to storing the processor wake policy on remote storage.

Example 20 may include subject matter, such as a method, means for performing acts, or a machine readable medium including instruction that when performed by a machine cause the machine to perform acts comprising receiving data at a mobile device via a wireless connection, storing the received data on a computer readable storage device, validating the received data, comparing the validated received data to a policy specifying a context of the mobile device, and waking a processor when the validated received data complies with the policy.

In example 21, the subject matter of example 20 wherein an optional control unit performs the comparing independent of the processor and while the processor is not in an awake state.

In example 22, the subject matter of examples 20-21 wherein the computer readable storage device optionally comprises processor secure storage that is not directly accessible to the processor.

Example 23 may include subject matter, such as a method, means for performing acts, or a machine readable medium including instruction that when performed by a machine cause the machine to perform acts comprising, receiving data at a mobile device via a wireless connection, validating the received data, comparing the validated received data to a policy specifying a context of the mobile device, and waking a processor when the validated received data complies with the policy.

In example 24, the subject matter of example 23 wherein a control unit optionally performs the comparing independent of the processor and while the processor is not in an awake state.

In example 25, the subject matter of examples 23-24 wherein the computer readable storage device optionally comprises processor secure storage that is not directly accessible to the processor.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The invention claimed is:

1. A device comprising:
   a processor having a standby state;
   a storage device storing a processor wake policy;
   a context module to provide an interface to a user of the device to allow the user of the device to define a criterion for waking the processor, the criterion part of the processor wake policy and including a location of the device; and
   a control unit coupled to the processor and arranged to:
      receive wireless identification information;
      determine that the criterion for waking the processor in the processor wake policy is met by the received wireless identification information; and
      wake the processor from the standby state to an active state responsive to determining that the criterion in the processor wake policy is met.

2. The device of claim 1 wherein the wireless identification information comprises RFID packets.

3. The device of claim 2 wherein the control unit validates encrypted and signed RFID packets.

4. The device of claim 1 wherein the control unit selectively discontinues receipt of wireless identification information.

5. The device of claim 1 and further comprising an RFID module having an antenna, circuitry, and a memory bank, the RFID module being coupled to the control unit to provide wireless identification information directly to the control unit, wherein the RFID module memory bank is not directly accessible to the processor.

6. The device of claim 5 wherein the wireless identification information comprises RFID packets that include a unique RF TAG ID, and wherein packets not having the unique RF TAG ID are rejected.

7. The device of claim 5 wherein the RFID module is directly coupled to the control unit via a secure connection.

8. The device of claim 1, wherein the interface is provided to the user of the device to define the processor wake policy to include criterion based on specific applications and types of applications.

9. The device of claim 1 and further comprising a cloud module to store the processor wake policy on remote storage.

10. The device of claim 9 wherein the cloud module encrypts the processor wake policy prior to storing the policy on remote storage.

11. A mobile device comprising:
    a processor having a standby state;
    a storage device storing a processor wake policy;
    a touchscreen coupled to the processor;
    an RFID module to receive an RFID packet;
    a context module to execute on the processor and to provide an interface to a user of the device to allow the user of the device to define a criterion for waking the processor, the criterion part of the processor wake policy and including a location of the device; and
    a control unit coupled to the processor and to the RFID module, the control unit arranged to:
       determine that the criterion for waking the processor in the processor wake policy is met by information in the received RFID packet; and
       wake the processor from the standby state to an active state responsive to determining that the criterion in the processor wake policy is met.

12. The device of claim 11 wherein the control unit validates encrypted and signed RFID packets.

13. The device of claim 12 wherein the control unit selectively discontinues receipt of wireless identification information upon receipt of a selected number of unauthorized RFID packets.

14. The device of claim 12 wherein only RFID packets that include a unique RF TAG ID are validated.

15. The device of claim 11, wherein the interface is provided to the user of the device to define the processor wake policy to include a criterion based on specific applications and types of applications.

16. The device of claim 12 and further comprising a cloud module to execute on the processor to store the processor wake policy on remote storage.

17. The device of claim 16 wherein the cloud module encrypts the policy prior to storing the processor wake policy on remote storage.

18. A method comprising:
    using one or more computer processors:
    providing an interface to a user to define a criterion for waking a processor of the one or more computer processors, the processor having a standby state, and the criterion part of a processor wake policy and including a location of the device;
    receiving the processor wake policy;
    responsive to receiving the processor wake policy, storing the processor wake policy in a memory;
    receiving wireless identification information;
    determining that the criterion for waking the processor in the processor wake policy is met by the received wireless identification information; and
    waking the processor from the standby state to an active state responsive to determining that the criterion in the processor wake policy is met.

19. The method of claim 18 wherein the memory comprises processor secure storage that is not directly accessible to the processor.

20. A non-transitory computer readable medium having instructions for causing a device to perform a method, the method comprising:
- providing an interface to a user to allow the user to define a criterion for waking a processor having a standby state, the criterion part of a processor wake policy and including a location of the device;
- receiving the processor wake policy;
- responsive to receiving the processor wake policy, storing the processor wake policy in a memory;
- receiving wireless identification information;
- determining that the criterion for waking the processor in the processor wake policy is met by the received wireless identification information; and
- waking the processor from the standby state to an active state responsive to determining that the criterion in the processor wake policy is met.

21. The non-transitory computer readable medium of claim 20 wherein the memory comprises processor secure storage that is not directly accessible to the processor.

* * * * *